Patented Mar. 3, 1931

1,794,539

UNITED STATES PATENT OFFICE

ROBERT C. PALMER, OF PENSACOLA, FLORIDA

PROCESS OF REVIVIFYING ADSORBENT MATERIAL

No Drawing.   Application filed January 2, 1930. Serial No. 418,159.

The invention disclosed herein relates to a process of revivifying adsorbent material and more particularly to a process of revivifying fuller's earth after it has become saturated with impurities from use in the purification of rosin.

The problem of purifying rosin, more particularly wood rosin, has occupied the minds of experts in the art for a score of years. Rosin, particularly that extracted from the stumps of trees or chipped wood and known as wood rosin, contains a considerable amount of impurities which impart to it a dark color and make it unfit for use in the sizing of paper or in the manufacture of soaps. Various methods have heretofore been proposed to purify wood rosin, one of said methods being the filtration of the rosin through fuller's earth.

Despite the apparent simplicity of the fuller's earth method as compared to previously suggested methods, it has not found application on a commercial scale, to the best of my knowledge. The reason for this, apparently resides in the fact that the impurities in rosin are so abundant or else the saturation point of fuller's earth for such impurities is so low, that a quantity of fuller's earth equal to 2 or 3 times the weight of a given quantity of crude rosin is necessary in order to bring the purity of the rosin up to a point of commercial utility.

For instance, if a given sample of wood rosin, such as grade FF, is dissolved in a suitable solvent, for example petroleum naphtha, and passed through a bed of fuller's earth, the first runs of the filtrate from the earth contain rosin in a very pure form; but as a greater quantity of solution is passed through the same bed, the filtrate therefrom contains the rosin in decreasing grades of purity until finally a point is reached where the filter bed is practically inoperative to extract any further impurities. If the filtration is halted when the quantity of solution passed through the earth is such that its rosin content is ½ the weight of the fuller's earth contained in the filter bed, and if all the rosin in the filtrate is collected as by evaporation of the solvent, the resulting rosin is of grade I. It is therefore evident that any further filtration will yield filtrates containing rosin of a much poorer grade than I thereby decreasing the average grade of the entire filtrate. Since grade I is practically the first grade of commercial merit after the crude rosin itself (FF), it is obvious that the fuller's earth cannot be used practically for filtering more than half of its weight of rosin.

The value of this process is therefore dependent upon the discovery of a commercially practical method for revivifying the fuller's earth, that is for freeing the earth from the adsorbed impurities and restoring to it its original adsorptive powers.

A method is proposed in U. S. Patent No. 1,523,802 for revivifying fuller's earth by washing the same with pine oil. However, to the best of my knowledge this method has never met with commercial success, most probably for the reason that the fuller's earth reacts upon the pine oil producing various polymerization products, which constitute not only a waste of pine oil, but settle in the pores of the earth and constitute in themselves an objectionable impurity.

In my copending application Serial No. 242,516, filed December 24, 1927, of which the present application is a continuation in part, I have proposed a process for revivifying fuller's earth by means of an alcohol-naphtha solution. This method has met with commercial success and is at present used on a large scale in certain rosin plants in this country.

This invention is a further development of the process of said copending application having as an object the provision of various solvents for use in the revivification of adsorbent clays.

A further object of the invention is to provide a method for revivifying fuller's earth by washing the earth with a mixture of a rosin solvent and any one of a group of organic compounds having a relatively high miscibility with the rosin solvent.

An additional object of the invention comprises the use of such an organic compound having a boiling point materially different from that of the rosin solvent and dissolved impurities so as to be readily and easily separated therefrom.

Other and further important objects of this invention will become apparent from the following description and appended claims.

In order to develop further the art relating to the revivification process indicated above, it was necessary first to determine what solvents were capable of extracting a high percentage of the impurities adsorbed on the fuller's earth and, second, the practicability of commercial application of such solvents.

As regards the first problem I found that there exists some unexplainable relation between the capacity of a given solvent to dissolve impurities off the earth on the one hand and its miscibility with water and petroleum naphtha on the other hand. This relation may be summarized as follows: A solvent that has a high miscibility with both a rosin solvent, such as petroleum naphtha, and water at the operating temperatures of the process (usually around or above 65° C.), is also a good extractor for the rosin impurities deposited on the fuller's earth. A solvent that has a low miscibilty with either water or a rosin solvent, preferably petroleum naphtha, is generally a poor solvent for the absorbed impurities; furthermore, this variation in solubility of the adsorbed impurities in the different solvents, although not expressible as a simple mathematical function of the miscibilities of the solvents in water or petroleum naphtha, may nevertheless be roughly foretold by considering such miscibilities. In general, the lower the miscibilities of the solvents in water or/and petroleum naphtha, the poorer the extractive powers of the solvents in question for the rosin impurities adsorbed on the earth. While the relation between the extractive powers of the solvent and its solubility in naphtha may be considered logical in view of the fact that it is being used in a solution of naphtha, I can offer no theoretical reason for the relation with respect to water solubility. Its truth is, nevertheless, outstanding from the table below. This table is a comparative representation of the relative solvent action of various organic liquids on the rosin impurities adsorbed on fuller's earth. For the purpose of effectively comparing the extracting power of each solvent, the following standard procedure was adopted.

200 grams of fuller's earth were used as a filter for rosin dissolved in a solvent therefor, preferably petroleum naphtha. The same grade and quantity of rosin (200 grs.) and the same quantity of rosin solvent (1600 cc.) was used in each trial. This I shall refer to as a standard quantity of rosin solution. In the case of each test a standard quantity of rosin solution was passed through the given sample of fuller's earth, and then was followed by a standard volume (250 cc.) of a 50:50 mixture of the liquid tested and the rosin solvent. The collected filtrate was then evaporated and the residual rosin impurities were collected and weighed. The weight of these impurities was then compared with the weight of impurities extracted by the use of a 50:50 ethyl alcohol-petroleum naphtha mixture, the latter weight being arbitrarily designated as 100% revivification. Before filtering the next standard quantity of rosin solution through the given sample of fuller's earth, the revivification of the latter was brought to approximate completion in each case by following the standard volume of naphtha plus liquid being tested by a standard volume (250 cc.) of the 50:50 alcohol-naphtha solution. The results were as follows:

The symbol ∞ stands for miscibility in all proportions.

| Solvent | Solubility in petroleum naphtha | Solubility in water | Per cent revivification | Tested at a temp. of— |
|---|---|---|---|---|
| Alcohol (ethyl, anhydrous, denatured) | ∞ | ∞ | 100 | 60° C. |
| Methyl alcohol | ∞ above 60° C. | ∞ | 97.5 | 60° |
| Acetone | ∞ | ∞ | 94 | 40° |
| Diethylene-glycol-monobutyl-ether | ∞ | ∞ | 89–90.5 | 95° |
| Furfuralcohol | ∞ above 98° C. | ∞ | 90 | 98° |
| Phenol | ∞ above 77° C. | ∞ above 67° C. | 80 | 85° |
| Ethyl acetate | ∞ | 9.6% @ 65° C. | 79 | 60° |
| Furfuraldehyde | ∞ above 95° C. | 19% @ 85° C. | 79 | 90° |
| Benzyl alcohol | ∞ above 38° C. | 4% @ 17° C. | 76 | 70° |
| Ortho-toluidine | ∞ | 3.5% @ 85° C. | 65 | 85° |
| Aniline | ∞ above 72° C. | 5% @ 85° C. | 53 | 85° |
| Ethyl ether | ∞ | 7.5% @ 25° C. | 35 | 25° |
| Benzene | ∞ | 0.07% @ 22° C. | 25 | 60° |
| Toluene | ∞ | 0.04% @ 65° C. | 18 | 60° |

It should be understood that although for the purpose of comparison a 50:50 mixture of the solvent in question with petroleum naphtha was used, such condition is not an absolute necessity in practice.

Other rosin solvents than naphtha may be used, as for instance, gasoline or other fractions of petroleum which lend themselves to easy recovery by simple distillation. Also, the concentrations of the solvents in the mixture may vary through a wide range. This is indicated by the table below which shows the extracting powers of equal volumes of various concentrations of alcohol in naphtha and acetone in naphtha. The standard of comparison is again the weight of impurities extracted by a volume of a 50:50 alcohol naphtha mixture.

| Concentration by volume | | % Revivification | |
|---|---|---|---|
| Alcohol or acetone respectively | Naphtha | Alcohol | Acetone |
| 5 | 95 | 40 | 24 |
| 15 | 85 | 80 | 50 |
| 25 | 75 | 88 | 63 |
| 35 | 65 | 94 | 81 |
| 50 | 50 | 100 | 92-94 |
| 100 | 0 | 100 | 100 |

It is seen from this table that a 35:65 mixture of alcohol-naphtha compares very favorably, as to its practical utility, with a 50:50 mixture. Similarly other ratios may be conveniently chosen from a table like the above for use with other solvents.

I have also found that to be capable of application on a large scale the revivifying or extracting liquid must lend itself to a relatively high recovery both from the impurities it dissolves and from the naphtha or other rosin solvent. Furthermore this recovery must be as simple and inexpensive as possible. Fractional distillation is the most logical process for this recovery. From this viewpoint, the substances indicated above which have good extractive properties may be subdivided into 3 groups:

(1) Those which boil below naphtha and may therefore readily be separated therefrom in the forerun, that is the first fractions obtained by distillation of the mixture.

(2) Those which boil above naphtha and may be recovered in the tailings, that is, the last fractions obtained in the distillation.

(3) Those which have a boiling point falling within the boiling range of naphtha, and cannot therefore be separated therefrom by distillation.

Of these, group 3 is not suitable at all for use, unless a solvent different from naphtha be chosen. Groups 1 and 2 are both applicable, but since the separation of group 1 is simpler, particularly where the ratio of revivifier to naphtha is less than 1:1, it is to be preferred.

The extraction solvents mentioned above accordingly are classifiable as follows:

| Solvent | % Revivification |
|---|---|
| Group 1: | |
| Ethyl alcohol | 100 |
| Methyl alcohol | 97.5 |
| Acetone | 94 |
| Ethyl acetate | 79 |
| Ethyl ether | 35 |
| Benzene | 25 |
| Toluene | 18 |
| Group 2: | |
| Diethylene-glycol-monobutyl-ether | 90.5 |
| Furfuralcohol | 90 |
| Phenol | 80 |
| Furfuraldehyde | 79 |
| Benzyl alcohol | 76 |
| Ortho-toluidine | 65 |
| Aniline | 53 |

It can thus be seen that of all the extraction solvents specifically mentioned, ethyl alcohol, methyl alcohol, acetone, and ethyl acetate form the most practical revivifiers. These particular compounds may be generically classified as being oxygen containing derivatives of low molecular weight aliphatic hydrocarbons.

While, in the specification and claims, fuller's earth has been specified as the adsorbent material, it will be understood that this term is intended to include any suitable adsorbent clay.

The temperature at which the revivification step is performed is not limited except that it must be above the temperature of substantial miscibility of the revivifying liquid and rosin solvent and below the boiling temperature of the mixture.

I am aware that numerous details of the process may be varied through a wide range without departing from the principles of this invention, and I, therefore, do not purpose limiting the patent granted hereon otherwise than necessitated by the prior art.

I claim as my invention:

1. The process of revivifying fuller's earth that has become contaminated with rosin impurities through use as a filter for rosin, which comprises washing the earth with a solution consisting of a rosin solvent and an organic revivifying liquid having a high miscibility with the rosin solvent employed and at least moderate miscibility with water at the operating temperatures of the process.

2. The process of revivifying fuller's earth that has become contaminated with rosin impurities through use as a filter for rosin, which comprises washing the earth with a solution consisting of a light petroleum distillate and an organic revivifying liquid having a high miscibility with the petroleum distillate employed and at least moderate miscibility with water at the operating temperatures of the process.

3. The process of revivifying fuller's earth that has become contaminated with rosin impurities through use as a filter for rosin, which comprises washing the earth with a solution consisting of petroleum naphtha and an organic revivifying liquid having a high miscibility with pertoleum naphtha and at least moderate miscibility with water at the operating temperatures of the process.

4. The process of revivifying fuller's earth that has become contaminated with rosin impurities through use as a filter for rosin, which comprises washing the earth at temperatures around or above 65° C. with a solution consisting of a rosin solvent and an organic revivifying liquid having a high miscibility with the rosin solvent employed and at least moderate miscibility with water at the operating temperatures of the process.

5. The process of revivifying fuller's earth that has become contaminated with rosin impurities through use as a filter for rosin, which comprises washing the earth at temperatures around or above 65° C. with a solution consisting of petroleum naphtha and an organic revivifying liquid having a high miscibility with the petroleum naphtha employed and at least moderate miscibility with water at the operating temperatures of the process.

6. The process of revivifying fuller's earth which has become contaminated with rosin impurities through use as a filter for rosin, which comprises washing the earth with a mixture consisting of petroleum naptha and an organic revivifying liquid which has a high miscibility at the temperature employed with petroleum naphtha and water and which also has a boiling range outside of the range of petroleum naphtha, the temperature employed being below the boiling point of the mixture.

7. The process of revivifying fuller's earth which has become contaminated with rosin impurities due to use as a filter for rosin, which comprises washing the earth with a mixture consisting of a light petroleum distillate and an organic revivifying liquid having a high miscibility with the petroleum distillate employed and at least moderate miscibility with water at the operating temperature of the process and which also has a boiling point below that of the petroleum naphtha.

8. The process of revivifying fuller's earth which has become contaminated with rosin impurities by use as a filter for rosin, which comprises washing the earth with a solution consisting of a rosin solvent and an oxygen containing derivative of a low molecular weight hydrocarbon of the aliphatic series having a high miscibility with the rosin solvent and at least moderate miscibility with water at the operating temperatures of the process.

9. A process as in claim 8 wherein the rosin solvent is petroleum naphtha.

10. A process as in claim 8 wherein the rosin solvent is petroleum naphtha and the oxygen containing derivative has a boiling point below petroleum naptha.

11. The process of revivifying fuller's earth which has become contaminated with rosin impurities through use as a filter for rosin, which comprises washing the earth with a solution consisting of a rosin solvent and an oxygen containing organic compound selected from a group comprising ethyl, methyl and benzyl alcohols, furfuralcohol, acetone diethylene-glycol-monobutyl-ether, phenol, ethyl acetate and furfuraldehyde.

12. The process of revivifying fuller's earth which has become contaminated through use as a filter for rosin, which comprises washing the earth with a solution consisting of a rosin solvent and acetone.

13. A process as in claim 12 wherein the rosin solvent is petroleum naphtha.

In testimony whereof I have hereunto subscribed my name at Pensacola, Escambia County, Florida.

ROBERT C. PALMER.